(12) United States Patent
Zhang et al.

(10) Patent No.: US 12,313,876 B2
(45) Date of Patent: May 27, 2025

(54) THROUGH-TYPE LAMP AND VEHICLE

(71) Applicant: BEIJING CHJ INFORMATION TECHNOLOGY CO., LTD., Beijing (CN)

(72) Inventors: Shiying Zhang, Beijing (CN); Bolin Sun, Beijing (CN)

(73) Assignee: BEIJING CHJ INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/692,371

(22) PCT Filed: Sep. 13, 2022

(86) PCT No.: PCT/CN2022/118326
§ 371 (c)(1),
(2) Date: Mar. 15, 2024

(87) PCT Pub. No.: WO2023/040798
PCT Pub. Date: Mar. 23, 2023

(65) Prior Publication Data
US 2024/0377574 A1  Nov. 14, 2024

(30) Foreign Application Priority Data
Sep. 16, 2021  (CN) .......................... 202122251736.4

(51) Int. Cl.
F21V 8/00   (2006.01)
(52) U.S. Cl.
CPC .............................. *G02B 6/0088* (2013.01)

(58) Field of Classification Search
CPC .................................................. G02B 6/0088
See application file for complete search history.

(56) References Cited

U.S. PATENT DOCUMENTS

2011/0116281 A1* 5/2011 Kuroiwa ............... F21S 45/33
                                                          362/548
2013/0107558 A1  5/2013 Tajima et al.

FOREIGN PATENT DOCUMENTS

| CN | 110242932 A | 9/2019 | |
| CN | 210485572 U | 5/2020 | |
| CN | 111637418 A | 9/2020 | |
| CN | 211600570 U | * 9/2020 | ............... F21Q 1/00 |
| CN | 212510967 U | 2/2021 | |
| CN | 113266799 A | 8/2021 | |
| CN | 215663169 U | 1/2022 | |
| DE | 19515544 A1 | 11/1995 | |
| EP | 3982034 A1 | 4/2022 | |

(Continued)

OTHER PUBLICATIONS

English Machine Translation of Hayashi jp h07192511 (Year: 2024).*

(Continued)

*Primary Examiner* — Donald L Raleigh

(57) ABSTRACT

A through-type lamp includes a housing and an outer surface cover. The housing is provided with a slot extending along the extension direction Y of the housing. The outer surface cover is provided with a protrusion extending in the extension direction of the outer surface cover. The protrusion is clamped in the slot, so that the housing and the outer surface cover (6) define a light chamber. A vehicle includes the through-type lamp.

19 Claims, 4 Drawing Sheets

(56) References Cited

FOREIGN PATENT DOCUMENTS

| FR | 3103755 A1 | 6/2021 | | |
|----|------------|--------|---|---|
| JP | H07192511 A | * | 7/1995 | ............... F21Q 1/00 |
| JP | 2021002450 A | | 1/2021 | |
| WO | 2023209168 A1 | | 11/2023 | |

OTHER PUBLICATIONS

English Machine Translation of Wang et al, CN 211600570 (Year: 2024).*
Search Report for corresponding EP22869167, mailed Jul. 23, 2024. (8 pages).
Written Opinion and International Search Report for corresponding application PCT/CN2022/118326, mailed Nov. 18, 2022, with English translation (28 pages).

* cited by examiner

THROUGH-TYPE LAMP AND VEHICLE

CROSS-REFERENCE TO RELATED APPLICATION

This application is a national phase entry under 35 USC § 371 of International Application PCT/CN2022/118326, filed on Sep. 13, 2022, which claims the benefit of and priority to Chinese Patent Application No. 202122251736.4, filed on Sep. 16, 2021, the entire contents of which are incorporated herein by reference.

FIELD

The present disclosure relates to the field of vehicles, and more particularly to a through-type lamp and a vehicle.

BACKGROUND

Vehicle lamps are eyes of vehicles, which have function of lighting and decoration. Nowadays, the design of vehicle lamp products has expanded from the demand for function to the pursuit of beauty. On the premise of satisfying the functionality of lamps, in order to significantly enhance sense of science and technology of the vehicle modeling and brand value, many vehicle companies are innovating in modeling design of lamps to attract consumers.

SUMMARY

The present disclosure provides a through-type lamp and a vehicle.

Embodiments of a first aspect of the present disclosure provide a through-type lamp. The through-type lamp includes a housing and an outer cover. The housing is provided with a slot extending along an extension direction Y of the housing. The outer cover is provided with a protrusion extending in an extension direction of the outer cover. The protrusion is clamped in the slot, so that the housing and the outer cover define a light chamber.

Embodiments of a second aspect of the present disclosure provide a vehicle, including the through-type lamp according to embodiments of the first aspect of the present disclosure.

BRIEF DESCRIPTION OF THE DRAWINGS

The drawings herein are incorporated into the specification and form a part of the specification, show embodiments that comply with the present disclosure, and are used to explain the principles of the present disclosure together with the specification.

In order to more clearly explain the technical solution of embodiments of the present disclosure or the related art, the drawings required to be used in the description of embodiments or the related art will be briefly described below, and it is obvious that for those skilled in the art, other drawings can be obtained according to these drawings without creative labor.

References signs: 1, light source; 2, inner cover; 21, first light entrance surface; 22, first light exit surface; 3, thick wall; 31, first end; 32, second end; 33, second light entrance surface; 34, second light exit surface; 35, first protruding part; 36, second protruding part; 37, top surface; 38, bottom surface; 4, reflector; 5, housing; 51, slot; 511, first side wall; 512, second side wall; 6, outer cover; 61, third end; 62, fourth end; 63, third light exit surface; 64, protrusion; 65, light transmission part; 651, first positioning protrusion; 652, second positioning protrusion; 653, positioning block; 66, first coupling part; 661, first positioning part; 67, second coupling part; 671, second positioning part; 91, upper decoration frame; 92, lower decoration frame; 93, main decoration frame.

DETAILED DESCRIPTION

In order to more clearly understand the purpose, features and advantages of the present disclosure, solutions of the present disclosure will be further described below. It should be noted that the embodiments and the features in the embodiments of the present disclosure can be combined with each other without conflict.

In order to fully understand the present disclosure, many specific details are explained in the following description, but the present disclosure can also be implemented in other ways different from those described here; obviously, the embodiments in the description are only a part of embodiments of the present disclosure, not all of them.

In recent years, through-type lamps and vehicle logo lights have become new hotspots in lamp design. The through-type lamp has a longer length, and a light housing traditionally is installed by a plurality of snaps, thus resulting in a technical problem of poor stability of vehicle lamps after installation.

Figure 1:
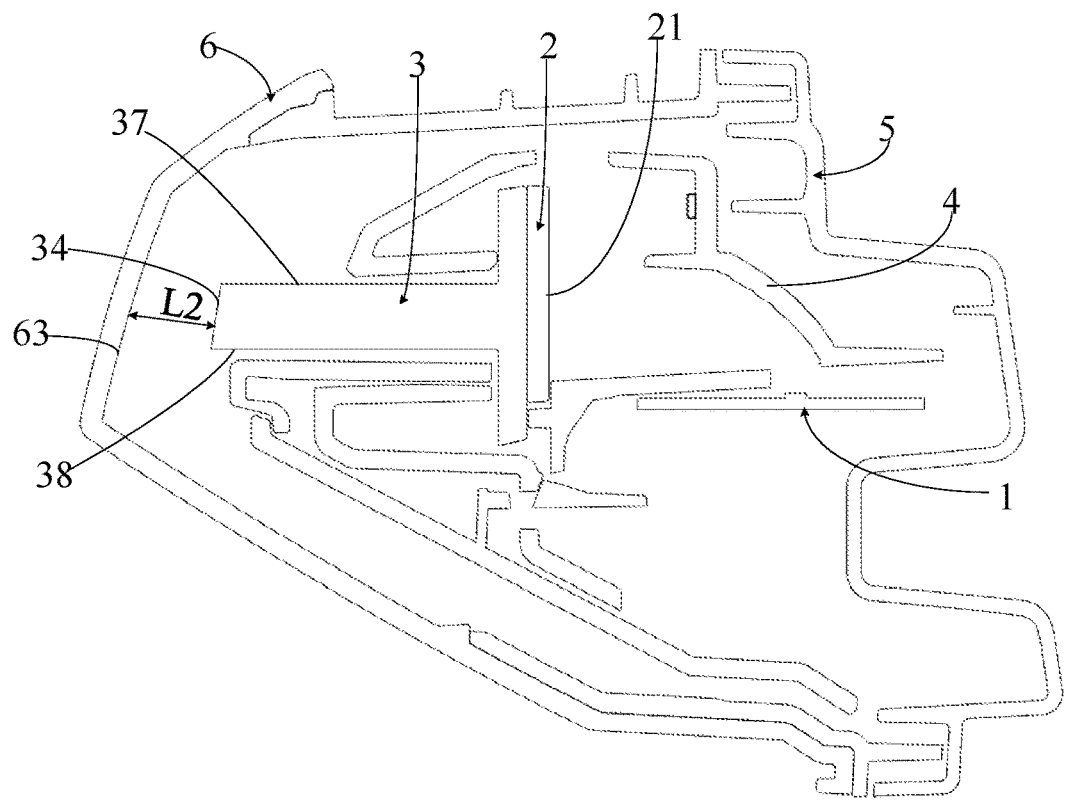
FIG. 1 is a cross sectional view of a through-type lamp according to an embodiment of the present disclosure.
Figure 2:
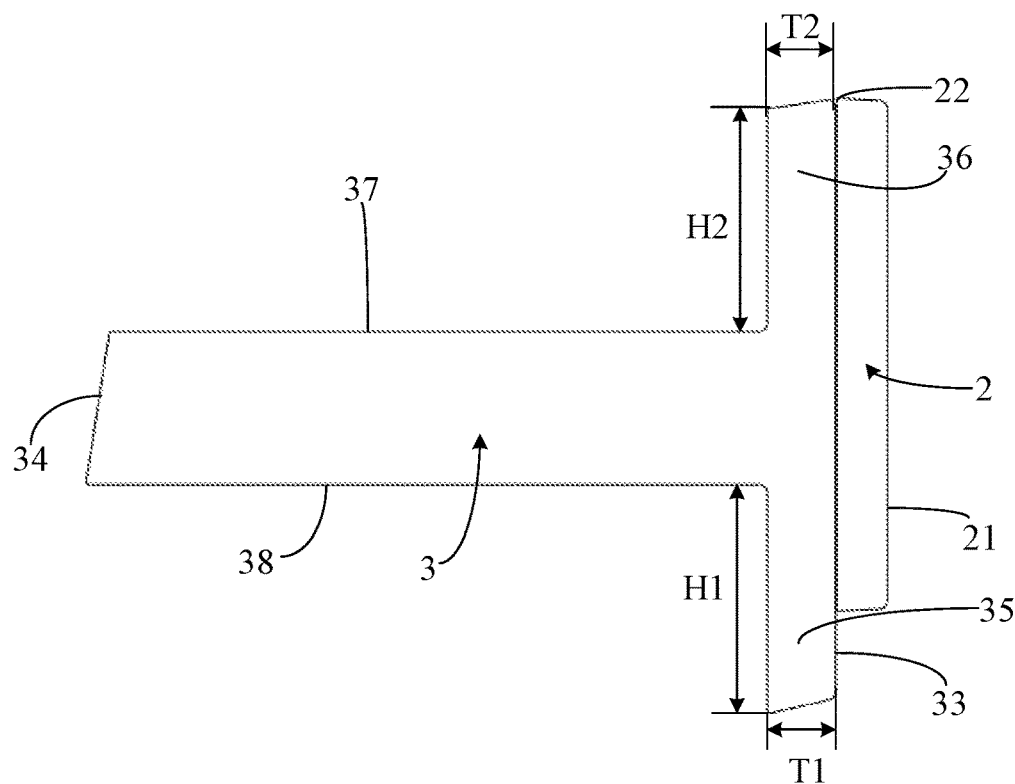
FIG. 2 is a cross sectional view of an inner cover and a thick wall in a through-type lamp according to an embodiment of the present disclosure.
Figure 3:
FIG. 3 is a structural schematic view of a through-type lamp according to an embodiment of the present disclosure.
Figure 7:
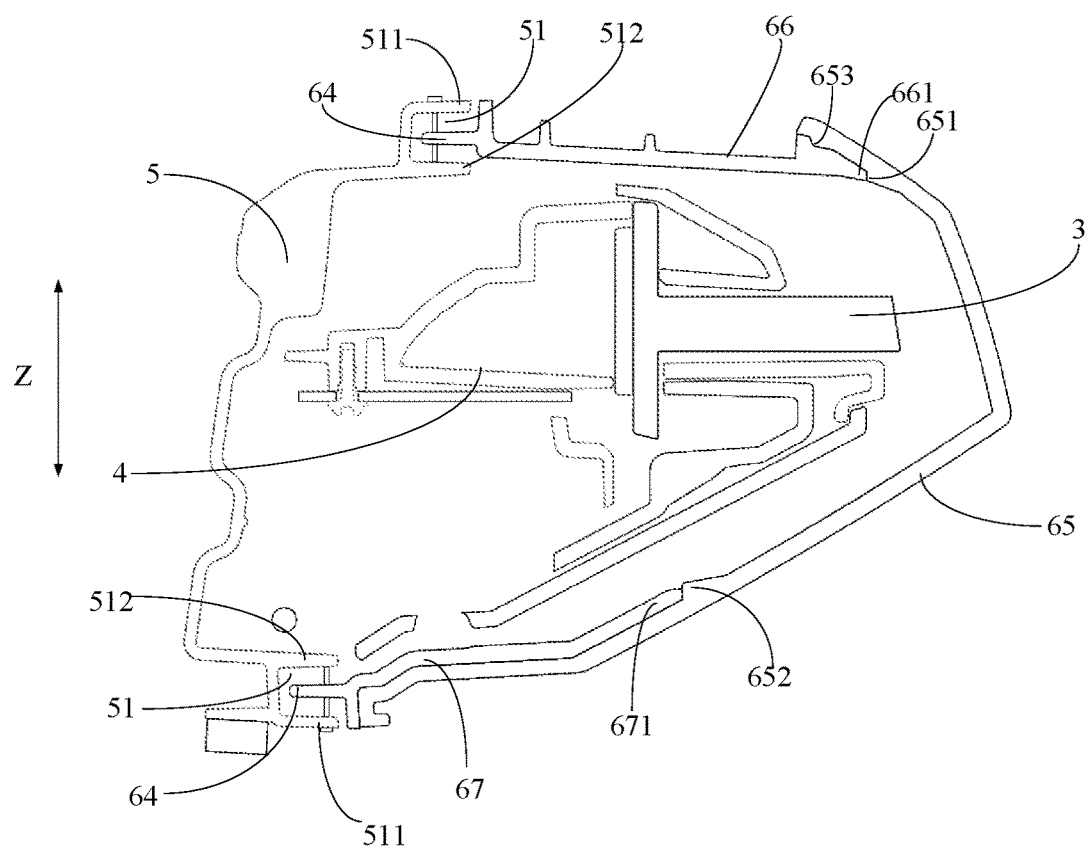
FIG. 7 is another cross-sectional view of a through-type lamp according to an embodiment of the present disclosure.
Figure 8:
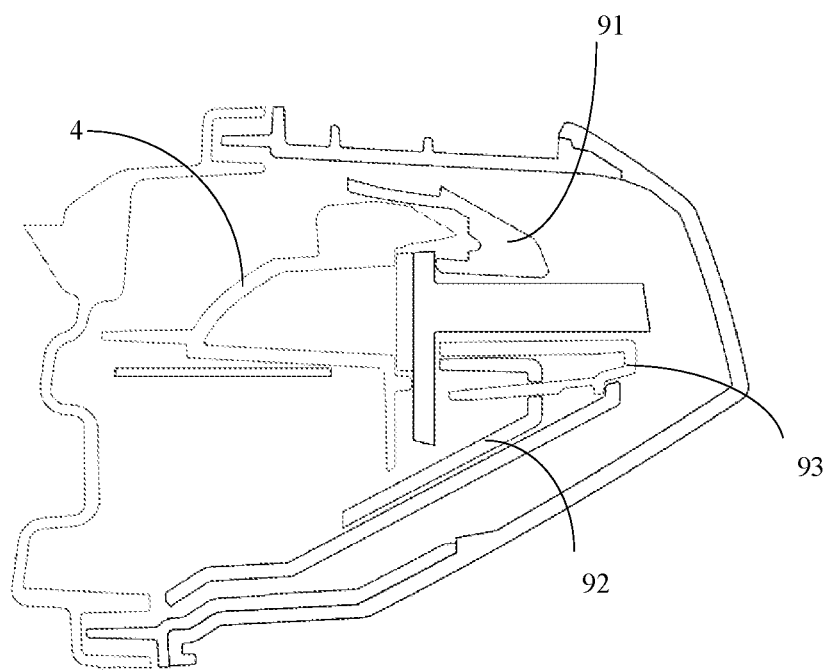
FIG. 8 is another cross-sectional view of a through-type lamp according to an embodiment of the present disclosure.

As illustrated in FIGS. 1, 7, and 8, a through-type lamp provided in the embodiments of the present disclosure includes a housing 5 and an outer cover 6. The housing 5 is provided with a slot 51 extending along an extension direction Y of the housing 5 (The slot 51 is continuous along the extension direction Y of the housing 5). The outer cover 6 is provided with a protrusion 64 extending in an extension direction of the outer cover 6 (The protrusion 64 is continuous along the extension direction of the outer cover 6). The protrusion 64 is clamped in the slot 51, so that the housing 5 and the outer cover 6 define a light chamber. By means of the cooperation between the continuous protrusion 64 and the continuous slot 51, the contact area between the housing and the outer cover is increased, and the stability of coupling is improved. The granular sensation during the light emitting due to a plurality of installation points is eliminated, bright spots formed at the installation points are avoided, and lighting and appearance effects are improved.

It should be noted that the extension direction Y is a width direction of a vehicle.

In some specific embodiments, the slot 51 includes a first side wall 511 and a second side wall 512. A fastener passes through the first side wall 511, the protrusion 64, and the second side wall 512 in sequence to fix the housing 5 and the outer cover 6. The protrusion 64 is fixed to two side walls of the slot 51 by the fastener, improving the stability of coupling. The fastener may be either a screw or a gun nail.

In some specific embodiments, the slot 51 is provided with a structural adhesive, and the housing 5 and the outer cover 6 are coupled through the structural adhesive, so that the sealing performance of the housing 5 and the outer cover 6 can be improved. The structural adhesive includes but is not limited to a two-component silicone, a single-component silicone, a PUR hot melt adhesive, and a Sika adhesive.

In some specific embodiments, along a height direction Z of the housing 5, opposite two sides of the housing 5 each are provided with the slot 51, and the outer cover 6 is provided with the protrusions 64 corresponding to the slots 51. By means of the cooperation between the slots 51 at the two sides of the housing 51 and the protrusions 64 at two sides of the outer cover, the stability of coupling between the housing 51 and the outer cover 6 is improved.

It should be noted that the height direction Z is a vertical direction of the extension direction Y of the housing 5, in other words, the height direction Z is a height direction of the vehicle.

In some specific embodiments, the outer cover 6 includes a light transmission part 65, and a first coupling part 66 and a second coupling part 67 separately coupled to the light transmission part 65; and the protrusions 64 are arranged at the first coupling part 66 and the second coupling part, respectively. By dividing the outer cover 6 into three parts, the light transmission part 65, the first coupling part 66 and the second coupling part 67 may be molded separately, and the difficulty of molding is reduced.

In some specific embodiments, the first coupling part 66 is provided with a first positioning part 661, the second coupling part 67 is provided with a second positioning part 671, the light transmission part 65 is provided with a first positioning protrusion 651 and a second positioning protrusion 652, the first positioning protrusion 651 is fitted with the first positioning part 661, and the second positioning protrusion 652 is fitted with the second positioning part 671. When the light transmission part 65 is installed with the first coupling part 66 and the second coupling part 67, the possibility that the light transmission part 65 moves up and down is reduced, and the stability of coupling is increased.

In some specific embodiments, the first coupling part 66 is provided with a positioning groove, the light transmission part 65 is provided with a positioning block 653, and the positioning block 653 is fitted with the positioning groove, so that the light transmission part 65 may be snapped in the first coupling part 66. By means of the cooperation between the positioning block 653 and the positioning groove, the coupling area of the first coupling part 66 and the light transmission part 65 is increased, thereby increasing the coupling strength of the coupling between the first coupling part 66 and the light transmission part 65.

In some specific embodiments, a light guide structure is arranged in the light chamber, and the light guide structure is coupled to the housing 5; the light guide structure includes a thick wall 3, an upper decoration frame 91 is arranged above the thick wall 3, and a lower decoration frame 92 is arranged below the thick wall 3. Specifically, the light guide structure further includes a light source 1, an inner cover 2 and a reflector 4. The reflector 4 is coupled to the housing 5 and is configured to reflect the light emitted from the light source 1 to the inner cover 2, and emit the light through the inner cover 2 and the thick wall 3 in sequence. The thick wall 3 and the reflector 4 are coupled by a fastener, and the inner cover 2 is arranged between the thick wall 3 and the reflector 4. The upper decoration frame 91 is arranged above the thick wall 3, the lower decoration frame 92 is arranged below the thick wall 3, and the upper decoration frame 91 and the lower decoration frame 92 are coupled to the reflector 4. The upper decoration frame 91 and the lower decoration frame 92 may have reflective effect and may reflect the light to the thick wall 3.

In some specific embodiments, a main decoration frame 93 coated with a coating is arranged below the thick wall 3, and the main decoration frame 93 is coupled to the lower decoration frame 92. In some embodiments, the main decoration frame 93 is snap-fitted with the lower decoration frame 92. The coating may be chrome, that is, a chrome plated decoration frame. The chrome is better than silver and nickel since the chrome does not change color and may maintain its reflective ability for a long time when used, to increase the reflective ability. When sunlight passes through the thick wall and irradiates on the main decoration frame 93 coated with the coating, the reflectivity of the main decoration frame 93 may reach 10% to 70%, and the color is very dark. At this time, when viewed from the outside, the top of a vehicle lamp is almost black, and the second light exit surface 34 is luminous, thus improving the aesthetic of the appearance of the vehicle lamp. Of course, the coating may also be aluminum or other metal coating.

In some specific embodiments, the reflector 4 is provided with a guide post, the lower decoration frame 92 is provided with a guide hole, and the guide hole is fitted with the guide post. By the means of the cooperation between the guide post and the guide hole, the lower decoration frame 92 may be positioned and be installed easily, and not prone to shake after installation, improving the stability of coupling.

In some specific embodiments, the housing 5 is coupled to a front-end frame through a fastener. In some embodiments, in the extension direction of the housing 5, the housing may be fixed with the front-end frame by a plurality of fasteners, and the stability of coupling is improved, so that the position of the housing 5 is not easy to move.

As illustrated in FIGS. 1, 2, 3, 4, 5, and 6, the through-type lamp provided in the embodiments of the present disclosure includes a light source 1, an inner cover 2, a thick wall 3 and a reflector 4. The reflector 4 is configured to reflect the light emitted from the light source 1 to the inner cover 2, and emit the light through the inner cover 2 and the thick wall 3 in sequence. The reflector 4 reflects the light emitted from the light source 1 to the inner cover 2, and emits the light through the inner cover 2 and the thick wall 3 in sequence, so that the light may be uniformly emitted from a light emitting surface. By the means of the cooperation of the light source 1, the inner cover 2 and the thick wall 3, the excellent light emitting effect of the vehicle through-type lamp may achieved, the granular sensation during the light emitting may be eliminated, and the user experience may be improved.

The thick wall 3 has a one-piece structure, which removes physical gaps between a plurality of lamps from design, so that the structure is more continuous, forming a through-type seamless and uniform lighting effect in static and lit states. In the static state, the thick wall 3 is a through-type structure, so that the structure is uninterrupted, and the visual effect is consistent. In the lit state, the light emitting surface is one-piece and through-type, and the thick wall 3 of the one-piece structure allows the light to be emitted uniformly from the light emitting surface with no interruption and no obvious dark regions.

Along an extension direction of the thick wall 3, the thick wall 3 includes a first end 31 and a second end 32, and a distance from the first end 31 to the second end 32 may be set according to the length demand of the through-type lamp, or according to the width of the vehicle, so that the thick wall 3 has a longer light emitting surface, which can meet the lighting demand. A length of thick wall 3 may be greater than 1500 mm, which may maximize the lighting length, may light up a larger area, meet the modeling needs of consumers, allows the vehicle lamp to more naturally reflect its streamline and lighting artistry, and may better show aesthetic feeling of the modeling and lighting of the vehicle lamp to consumers. By means of the cooperation between the inner cover 2 and the thick wall 3, the light is emitted from the light emitting surface uniformly. When the vehicle lamp is viewed from the front, the effect is aesthetic, the brightness of the light is relatively uniform when the whole thick wall 3 is lit up, and the user experience is improved.

It should be noted that the inner cover 2 may be made of any materials that meet the light transmittance requirements. In some embodiments, the inner cover 2 is made of a material with a light transmittance greater than or equal to 90%. In some embodiments, the inner cover 2 is a thin-walled injection molded member for optical homogenization. The thick wall 3 may be made of any materials that meet the light transmittance requirements. In some embodiments, the thick wall 3 is made of a material with a light transmittance greater than or equal to 90%. In some embodiments, the thick wall 3 is an injection molded member for optical homogenization. The reflector 4 may be a metal material or a plastic material. In some embodiments, the reflector 4 is aluminized or non-aluminized plastic injection molded member for light focusing.

It should also be noted that the inner cover 2 may be made of a light diffusion material. In some embodiments, the inner cover 2 may be a polycarbonate (PC) light diffusion plastic, i.e., a light-transmitting but opaque light diffusion material particle formed by using a transparent PC plastic as a base material, adding a certain proportion of light diffusion agent and other additives, and polymerizing them through a special process. In some embodiments, the light diffusion material may be made by adding materials that scatter light, such as BaSO4, to a colorless transparent PC base material. In some embodiments, the light diffusion materials may further be made by adding materials that scatter light, such as macromolecular cluster materials, to the colorless transparent PC base material. In some embodiments, the inner cover 2 is made by adding BaSO4 or macromolecular cluster materials to the colorless transparent PC base material.

The inner cover 2 has a one-piece structure, which removes physical gaps between a plurality of lamps from design, so that the structure is more continuous, forming a through-type seamless and uniform lighting effect in static and lit states. In the static state, the inner cover 2 is a through-type structure, so that the structure is uninterrupted, and the visual effect is consistent. In the lit state, the light emitting surface is one-piece and through-type, and the inner cover 2 of the one-piece structure allows the light to be emitted from the light emitting surface uniformly with no interruption and no obvious dark regions.

The light source 1 includes a circuit board and an LED light source, and the circuit board may be a PCB board or a PCBA board. The circuit board is electrically coupled to the LED light source to allow the LED light source to be lit up or extinguished.

In some specific embodiments, the inner cover 2 includes a first light entrance surface 21 and a first light exit surface 22, and the thick wall 3 includes a second light entrance surface 33 and a second light exit surface 34. A distance L1 (not illustrated in figures) from the first light exit surface 22 to the second light entrance surface 33 satisfies 0≤L1≤1 mm. The reflector 4 reflects the light emitted from the light source 1 to the inner cover 2 and emits the light through the inner cover 2 and the thick wall 3 in sequence, so that the light may be emitted from the second light exit surface 34 uniformly. By the means of the cooperation between the inner cover 2 and the thick wall 3, the excellent light emitting effect of the vehicle through-type lamp may be achieved, the granular sensation during the light emitting of the second light exit surface 34 is eliminated, and the user experience is improved. The distance from the first light exit surface 22 to the second light entrance surface 33 may be any numbers between 0 to 1 mm, such as 0, 0.2 mm, 0.4 mm, 0.6 mm, 0.8 mm, and 1 mm. When the distance between the first light exit surface 22 and the second light entrance surface 33 is between 0 and 1 mm, the light may be emitted from the light emitting surface uniformly, that is, it satisfies a linear ratio ≥75%. The linear ratio may reflect the uniformity of the linear distribution, which refers to the ratio of a minimum value min and a maximum value max of the brightness in a through line (i.e., a continuous extending line on the second light exit surface 34 of the thick wall 3 along the extension direction of the thick wall 3 (i.e., the Y direction)). For example, according to the structure of the present application, the brightness distribution (unit is nit) curve in the through line of the second light exit surface 34 is measured, which satisfies condition A: min/max>75%; and condition B: under the premise that the data is not homogenized, the linear data fluctuation range Δ<10% of the minimum value min. Furthermore, the uniformity of the light emitting surface of the lamp may also be measured by the brightness distribution of point domains, in which the brightness of a plurality of points (such as 10 to 100) in a certain area (such as a circle area, a quadrilateral area, etc.) on the light emitting surface is measured, and the uniformity of the light emitting surface is evaluated by comparing a ratio of the minimum value Nmin and the maximum value Nmax of point brightness (unit is nit) Nmin/Nmax (i.e., a regional ratio). For each point, multiple measurements are made, and an average value of the brightness measured servers as a brightness value of the point. The lamp according to the present application satisfies Nmin/Nmax>0.9 on the second light exit surface 34.

The smaller the distance from the first light exit surface 22 to the second light entrance surface 33, the better the uniformity of light emitting.

In some embodiments, when the distance from the first light exit surface 22 to the second light entrance surface 33 is 0, the first light exit surface 22 is snugly fitted to the second light entrance surface 33 without a gap, so that the light is emitted from the second light exit surface 34 uniformly, the granular sensation during the light emitting of the second light exit surface 34 is eliminated, the excellent light emitting effect of the vehicle through-type lamp may be achieved, and the user experience is improved.

In some specific embodiments, along the height direction (Z) of the thick wall 3, the thick wall 3 includes a top surface 37 and a bottom surface 38. The bottom surface 38 is provided with a first protruding part 35, the top surface 37 is provided with a second protruding part 36, and the first protruding part 35 and the second protruding part 36 extend along the extension direction of the thick wall 3. The first protruding part 35 and the second protruding part 36 may avoid seeing the internal structure of the vehicle lamp from the thick wall 3, such as the light source 1, the reflector 4, etc., thus improving the sensory quality of the vehicle lamp. The thick wall 3 makes the structure more continuous, forming the through-type seamless and uniform lighting effect in static and lit states. In the static state, the thick wall 3 has the through-type structure, so that the structure is uninterrupted and the visual effect is consistent. In the lit state, the second light exit surface 34 is one-piece and through-type, and the light is emitted from the second light exit surface 34 without interruption. The thick wall 3 of the one-piece structure allows the light to be emitted from the second light exit surface 34 uniformly with no interruption and no obvious dark regions.

Along the height direction (Z) of the thick wall 3, a height H1 of the first protruding part 35 satisfies: 2 mm≤H1≤20 mm, and a height H2 of the second protruding part 36 satisfies: 2 mm≤H2≤20 mm, which avoids forming a reflection of the internal installation structure on the thick wall 3, improves the sensory quality of the vehicle lamp, allows the light to be emitted from the second light exit surface 34 in a one-piece and through-type manner in the lit state, and allows the light to be emitted from the second light exit surface 34 with no interruption and no obvious dark regions.

Along the direction from the second light entrance surface 33 to the second light exit surface 34, a thickness T1 of the first protruding part 35 satisfies: 2 mm≤T1≤10 mm, and a thickness T2 of the second protruding part 36 satisfies: 2 mm≤T2≤10 mm, which avoids forming a reflection of the internal installation structure on the thick wall 3, improves the sensory quality of the vehicle lamp, allows the light to be emitted from the second light exit surface 34 in one-piece and through-type manner in the lit state, and allows the light to be emitted from the second light exit surface 34 with no interruption and no obvious dark regions.

In some specific embodiments, the second light entrance surface 33, the second light exit surface 34, the top surface 37 and the bottom surface 38 each are a smooth surface, that is, the second light entrance surface 33, the second light exit surface 34, the top surface 37 and the bottom surface 38 are flat or optically polished surfaces, like the effect of a glass surface, and the sensory quality of the vehicle lamp is improved.

In some specific embodiments, the through-type lamp further includes the housing 5 and the outer cover 6. The housing 5 and the outer cover 6 are coupled and define the light chamber, and the light source 1, the inner cover 2, the thick wall 3 and the reflector 4 are arranged in the light chamber. The housing 5 may be a structure made of a black PP-GF30 material and configured to support the weight of the vehicle lamp. The outer cover 6 is a black or colorless transparent plastic injection molded member covered at an outermost side, which may be single-color or two-color or double-layer.

Figure 5:
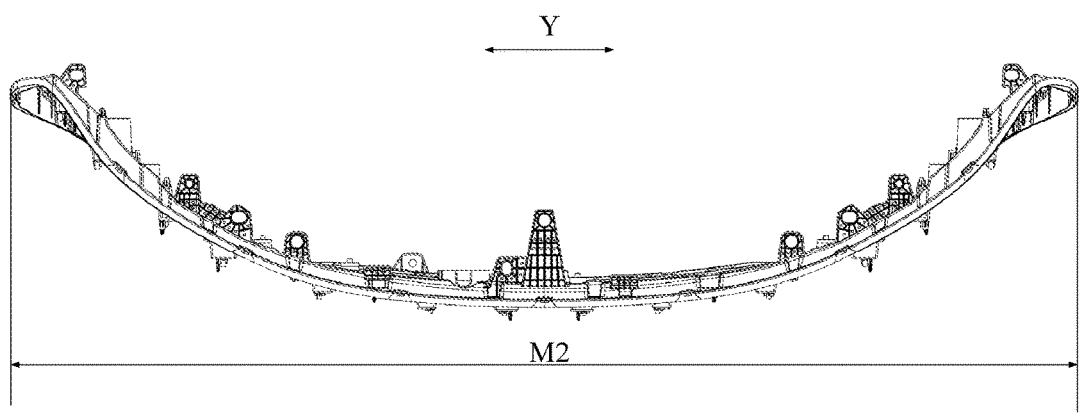
FIG. 5 is a structural schematic view of a housing in a through-type lamp according to an embodiment of the present disclosure.

As illustrated in FIG. 5, the housing 5 extends along the extension direction of the thick wall 3, and a distance M2 between two end parts of the housing 5 in the extension direction is greater than or equal to 1500 mm, so that the housing 5 and the thick wall 3 have a substantially identical length, and the lighting length is maximized. The housing 5 has a one-piece structure, which removes physical gaps between a plurality of through-type lamps from design, so that the structure is more continuous, forming a through-type seamless and uniform lighting effect in static and lit states. In the static state, the structure is uninterrupted. In the lit state, the light emitting surface is one-piece and through-type, with no interruption and no obvious dark regions.

Figure 4:
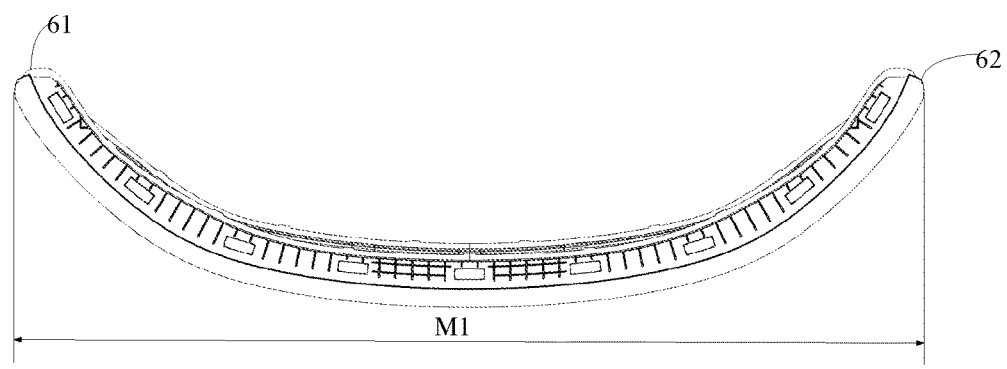
FIG. 4 is a structural schematic view of an outer cover in a through-type lamp according to an embodiment of the present disclosure.

An extension length of the outer cover 6 matches the housing 5, as illustrated in FIG. 4, the outer cover 6 extends along the extension direction of the thick wall 3, and a distance M1 between two end parts of the outer cover 6 in the extension direction is greater than or equal to 1500 mm, so that the outer cover 6 and the thick wall 3 have a substantially identical length, and the lighting length is maximized. The outer cover 6 has a one-piece structure, which removes physical gaps between the plurality of lamps from design, so that the structure is more continuous, forming a through-type seamless and uniform lighting effect in static and lit states. In the static state, the structure is uninterrupted. In the lit state, the visual effect is consistent, and the light emitting surface is one-piece, through-type and uniform with no interruption and no obvious dark regions.

In some specific embodiments, the outer cover 6 includes a third light exit surface 63, and the third light exit surface 63 is parallel to the second light exit surface 34. The third light exit surface 63 is basically parallel to the second light exit surface 34, and the third light exit surface 63 and the second light exit surface 34 have a substantially identical length, which maximizes the lighting length, so that the vehicle lamp more naturally reflects its streamline and lighting artistry, and may better show aesthetic feeling of the modeling and lighting of the vehicle lamp to consumers. The third light exit surface 63 is parallel to the second light exit surface 34, so that the light emitted from the third light exit surface 63 is one-piece and through-type, the light is emitted from the third light exit surface 63 uniformly, and the light is emitted from the third light exit surface 63 with no interruption and no obvious dark regions. When the vehicle lamp is viewed from the front, the effect is beautiful, the brightness of the light is relatively uniform when the whole vehicle lamp is lit up, the excellent light emitting effect of the vehicle through-type lamp may be achieved, and the user experience is improved.

In some specific embodiments, a distance L2 between the third light exit surface 63 and the second light exit surface 34 satisfies: 3 mm≤L2≤10 mm. In the lit state, the light emitted from the third light exit surface 63 is one-piece and through-type, the light is emitted from the third light exit surface 63 uniformly, and the light is emitted from the third light exit surface 63 with no interruption and no obvious dark regions. When the vehicle lamp is viewed from the front, the effect is beautiful, the brightness of the light is relatively uniform when the whole vehicle lamp is lit up, the excellent light emitting effect of the vehicle through-type lamp may be achieved, and the user experience is improved.

Figure 6:
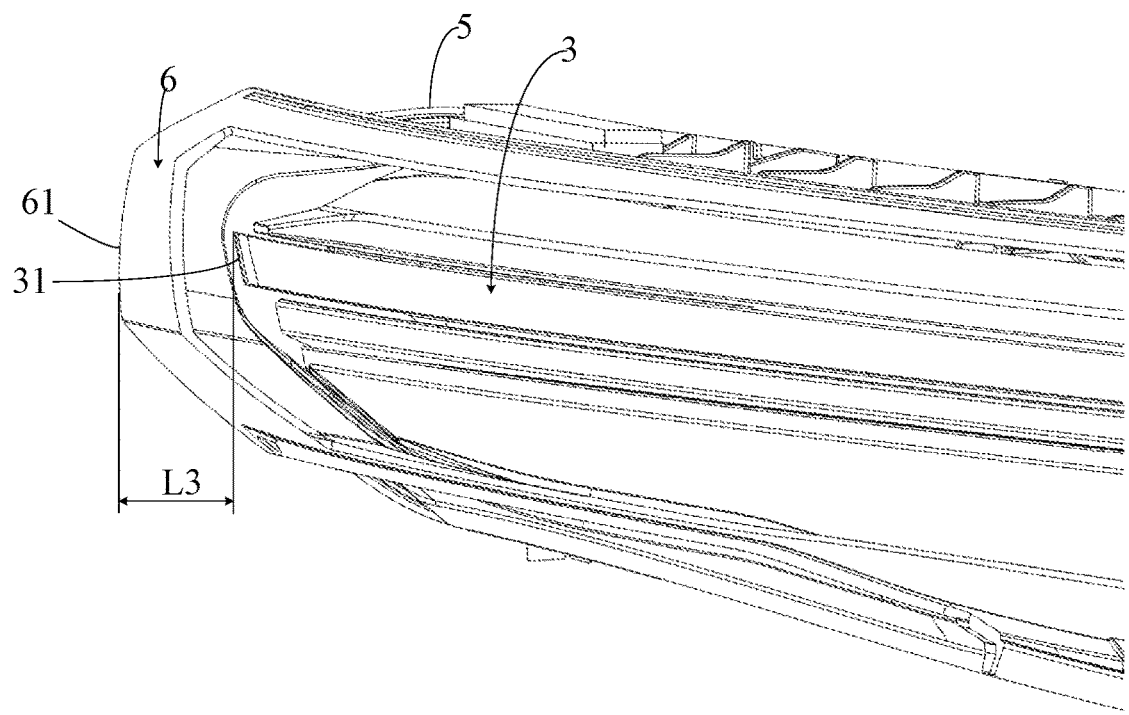
FIG. 6 is a partial enlarged view of a through-type lamp according to an embodiment of the present disclosure.

As illustrated in FIG. 6, along the extension direction of the outer cover 6, the outer cover 6 includes a third end 61 and a fourth end 62; a distance L3 from the first end 31 to the third end 61 satisfies: L3≤100 mm; and a distance L4 from the second end 32 to the fourth end 62 (not illustrated in figures) satisfies: L4≤100 mm, so that the thick wall 3 is as long as possible, and is as close as possible to the size of the outer cover 6, which may maximize the lighting length, may light up a larger area, allows the vehicle lamp to more naturally reflect its streamline and lighting artistry, and meets the modeling needs of consumers.

A vehicle provided in embodiments of the present disclosure includes the through-type lamp provided in the embodiments of the present disclosure. Since the vehicle provided in the embodiments of the present disclosure has the same advantages as the through-type lamp provided in the embodiments of the present disclosure, it is not repeated herein.

Embodiments of a first aspect of the present disclosure provide a through-type lamp, including a housing and an outer cover. The housing is provided with a slot extending along an extension direction Y of the housing. The outer cover is provided with a protrusion extending in an extension direction of the outer cover. The protrusion is clamped in the slot, so that the housing and the outer cover define a light chamber.

In some embodiments, the slot includes a first side wall and a second side wall, a fastener passes through the first side wall, the protrusion, and the second side wall in sequence to fix the housing and the outer cover.

In some embodiments, the slot is provided with a structural adhesive.

In some embodiments, along a height direction (Z) of the housing, opposite two sides of the housing each are provided with the slot; and the outer cover is provided with the protrusions in one-to-one correspondence with the slots.

In some embodiments, the outer cover includes a light transmission part, and a first coupling part and a second coupling part separately coupled to the light transmission part; and the protrusions are arranged at the first coupling part and the second coupling part, respectively.

In some embodiments, the first coupling part is provided with a first positioning part, the second coupling part is provided with a second positioning part, and the light transmission part is provided with a first positioning protrusion and a second positioning protrusion; the first positioning protrusion is fitted with the first positioning part, and the second positioning protrusion is fitted with the second positioning part.

In some embodiments, the first coupling part is provided with a positioning groove, the light transmission part is provided with a positioning block, and the positioning block is fitted with the positioning groove.

In some embodiments, a light guide structure is arranged in the light chamber, and the light guide structure is coupled to the housing; and the light guide structure includes a thick wall, an upper decoration frame is arranged above the thick wall, and a lower decoration frame is arranged below the thick wall.

In some embodiments, a main decoration frame coated with a coating is arranged below the thick wall, and the main decoration frame is coupled to the lower decoration frame.

A second aspect of the present disclosure provides a vehicle, including the through-type lamp.

It should be noted that in the present disclosure, relative terms such as "first" and "second" are only used to distinguish one entity or operation from another entity or operation, and do not necessarily require or imply any such actual relationship or order between these entities or operations. Furthermore, the term "include", "comprise" or any other variation thereof is intended to cover non-exclusive inclusions such that a process, method, article, or device comprising a series of elements includes not only those elements, but also other elements that are not expressly listed, or also includes elements inherent in such a process, method, article, or device. Without further limitation, an element defined by the phrase "comprising a . . . " does not exclude the presence of additional identical elements in the process, method, article or device comprising the element.

The above description is only specific embodiments of the present disclosure, so that those skilled in the art can understand or implement the present disclosure. Various modifications to these embodiments will be apparent to those skilled in the art, and the general principles defined herein may be implemented in other embodiments without departing from the scope of the present disclosure. Therefore, the present disclosure will not be limited to the embodiments described herein, but is to be accorded the broadest scope consistent with the principles and novel features disclosed herein.

All embodiments of the present disclosure can be implemented independently or in combination with other embodiments, which are all regarded as falling within the scope of protection required by the present disclosure.

What is claimed is:

1. A through-type lamp, comprising:
   a housing provided with a slot extending along an extension direction of the housing; and
   an outer cover provided with a protrusion extending in an extension direction of the outer cover,
   wherein the protrusion is clamped in the slot, so that the housing and the outer cover define a light chamber,
   the outer cover comprises a light transmission part, and a first coupling part and a second coupling part separately coupled to the light transmission part; and
   the protrusions are arranged at the first coupling part and the second coupling part, respectively.

2. The through-type lamp according to claim 1, wherein the slot comprises a first side wall and a second side wall, a fastener passes through the first side wall, the protrusion, and the second side wall in sequence to fix the housing and the outer cover.

3. The through-type lamp according to claim 1 wherein the slot is provided with a structural adhesive.

4. The through-type lamp according to claim 1, wherein along a height direction of the housing, opposite two sides of the housing each are provided with the slot; and
   the outer cover is provided with the protrusions in one-to-one correspondence with the slots.

5. The through-type lamp according to claim 1, wherein the first coupling part is provided with a first positioning part, the second coupling part is provided with a second positioning part, and the light transmission part is provided with a first positioning protrusion and a second positioning protrusion; the first positioning protrusion is fitted with the first positioning part, and the second positioning protrusion is fitted with the second positioning part.

6. The through-type lamp according to claim 1, wherein the first coupling part is provided with a positioning groove, the light transmission part is provided with a positioning block, and the positioning block is fitted with the positioning groove.

7. The through-type lamp according to claim 1, wherein a light guide structure is arranged in the light chamber, and the light guide structure is coupled to the housing; and
   the light guide structure comprises a thick wall, an upper decoration frame is arranged above the thick wall, and a lower decoration frame is arranged below the thick wall.

8. The through-type lamp according to claim 7, wherein a main decoration frame coated with a coating is arranged below the thick wall, and the main decoration frame is coupled to the lower decoration frame.

9. A vehicle, comprising:
   a through-type lamp comprising:
   a housing provided with a slot extending along an extension direction of the housing; and
   an outer cover provided with a protrusion extending in an extension direction of the outer cover, wherein the protrusion is clamped in the slot, so that the housing and the outer cover define a light chamber, the outer cover comprises a light transmission part, and a first coupling part and a second coupling part separately coupled to the light transmission part; and the protrusions are arranged at the first coupling part and the second coupling part, respectively.

10. The through-type lamp according to claim 7, wherein the light guide structure further includes a light source, an inner cover and a reflector, the reflector is coupled to the housing and configured to reflect the light emitted from the light source to the inner cover, and emit the light through the inner cover and the thick wall in sequence, the thick wall and the reflector are coupled by a fastener, and the inner cover is arranged between the thick wall and the reflector.

11. The through-type lamp according to claim 10, wherein the upper decoration frame and the lower decoration frame are coupled to the reflector and configured to reflect the light to the thick wall.

12. The through-type lamp according to claim 10, wherein the inner cover comprises a first light entrance surface and a first light exit surface, and the thick wall comprises a second light entrance surface and a second light exit surface; and a distance L1 from the first light exit surface to the second light entrance surface satisfies: $0 \leq L1 \leq 1$ mm.

13. The through-type lamp according to claim 12, wherein along a height direction of the extension direction of the thick wall, the thick wall comprises a top surface and a bottom surface, the bottom surface is provided with a first protruding part, the top surface is provided with a second protruding part, and the first protruding part and the second protruding part extend along the extension direction of the thick wall.

14. The through-type lamp according to claim 13, wherein along the height direction of the thick wall, a height H1 of the first protruding part satisfies: $2 \text{ mm} \leq H1 \leq 20$ mm, and a height H2 of the second protruding part satisfies: $2 \text{ mm} \leq H2 \leq 20$ mm.

15. The through-type lamp according to claim 13, wherein along a direction from the second light entrance surface to the second light exit surface, a thickness T1 of the first protruding part satisfies: $2 \text{ mm} \leq T1 \leq 10$ mm, and a thickness T2 of the second protruding part satisfies: $2 \text{ mm} \leq T2 \leq 10$ mm.

16. The through-type lamp according to claim 13, wherein each of the second light entrance surface, the second light exit surface, the top surface and the bottom surface is a smooth surface.

17. The through-type lamp according to claim 12, wherein the outer cover comprises a third light exit surface, and the third light exit surface is parallel to the second light exit surface.

18. The through-type lamp according to claim 7, wherein the housing extends along the extension direction of the thick wall, and a distance between two end parts of the housing in the extension direction is greater than or equal to 1500 mm.

19. The through-type lamp according to claim 7, wherein the outer cover extends along the extension direction of the thick wall, and a distance between two end parts of the outer cover in the extension direction is greater than or equal to 1500 mm.

* * * * *